(12) United States Patent
McCraw et al.

(10) Patent No.: US 7,823,942 B1
(45) Date of Patent: Nov. 2, 2010

(54) TOWING ACCESSORY

(75) Inventors: Ronnie McCraw, Rossville, GA (US); Claudia McCraw, legal representative, Rossville, GA (US); David C. Kissell, Charleston, TN (US)

(73) Assignee: Columbus McKinnon Corporation, Amherst, NY (US)

( * ) Notice: Subject to any disclaimer, the term of this patent is extended or adjusted under 35 U.S.C. 154(b) by 442 days.

(21) Appl. No.: 12/072,783

(22) Filed: Feb. 28, 2008

(51) Int. Cl.
*F16G 15/04* (2006.01)
(52) U.S. Cl. .................. 294/82.1; 59/93; 24/116 R
(58) Field of Classification Search .................. 294/1.1, 294/82.1, 82.11, 82.14, 2, 26, 74; 280/480; 59/93; 24/116 R
See application file for complete search history.

(56) References Cited

U.S. PATENT DOCUMENTS

| | | | |
|---|---|---|---|
| 1,886,138 A | 11/1932 | Wells | |
| 1,889,633 A * | 11/1932 | Butterworth | 24/116 R |
| 2,165,377 A * | 7/1939 | Henry | 24/116 R |
| 3,125,355 A * | 3/1964 | Snuggins | 280/457 |
| 3,464,720 A | 9/1969 | Abromavage et al. | |
| 3,729,926 A | 5/1973 | Buske | |
| 4,416,319 A * | 11/1983 | Hofmann | 152/213 R |
| 4,717,283 A | 1/1988 | Bach | |
| 5,564,766 A | 10/1996 | Lowery | |
| 5,724,804 A | 3/1998 | Smetz | |
| 6,237,976 B1 | 5/2001 | Whitt, Jr. | |
| 6,276,032 B1 | 8/2001 | Nortman et al. | |
| 6,474,676 B1 | 11/2002 | Palaia | |
| 6,568,165 B2 | 5/2003 | Smetz | |
| 6,626,623 B2 | 9/2003 | DeLay | |
| 7,269,937 B2 * | 9/2007 | Fredriksson | 59/93 |

* cited by examiner

*Primary Examiner*—Dean J Kramer
(74) *Attorney, Agent, or Firm*—Chambliss, Bahner & Stophel, P.C.

(57) ABSTRACT

A towing accessory for use in connection with a chain having a plurality of links includes an elongate body having a J-hook at one end and a T-hook at the other end. The J-hook has a hook portion that extends away from one side of the elongate body, and the T-hook has a T-cross that extends away from the opposite side of the elongate body. The elongate body also includes a central hole that is configured and sized so that adjacent links of the chain may pass therethrough, a first slot that extends from the central hole towards one end, and a second slot that extends from the central hole towards the other end. Both the first slot and the second slot are configured and sized so that a chain may be locked therein.

17 Claims, 2 Drawing Sheets

TOWING ACCESSORY

FIELD OF THE INVENTION

The present invention relates generally to accessories that are used in connection with the towing of vehicles, and more particularly to a towing accessory that is adapted for engaging a towing chain and one or more recesses in the frame of a vehicle.

BACKGROUND OF THE INVENTION

In connection with the towing of automobiles and other vehicles, it is almost always necessary to employ a chain to attach the vehicle to be towed to the towing vehicle. The use of one or more chains and one or more towing accessories is required even though the tow vehicle may employ but a single winch line. Even in the case of "roll-back" trucks, it is necessary to attach one or more chains to a disabled vehicle in order to pull it onto the roll-back platform. Conventionally, a single winch line from the towing vehicle is attached to a "V" chain assembly which includes an elongated ring to which two separate lengths of chain are permanently attached. A chain-shortening grab hook is attached to the link of each chain which is attached to the elongated ring, and a plurality of towing accessories are attached to the ends of the chains away from the elongated ring. These towing accessories include J-hooks, R-hooks and T-hooks, each of which may be attached to a portion of the frame, or fit within a recess in the frame, of a disabled vehicle. One or more of the J-hooks, R-hooks or T-hooks is attached to the frame of the vehicle and the winch from the towing vehicle is attached to the elongated ring. The chain-shortening grab hooks may then be attached to selected links of the chains to adjust the length of the chain segments between the elongated ring and the disabled vehicle.

One disadvantage of the conventional "V" chain assembly is that it is quite heavy and difficult for a person to handle. In addition, the various towing accessories and the chain-shortening grab hooks are likely to cause the assembly to become tangled when it is stored.

U.S. Pat. No. 6,568,165 describes a towing accessory that includes a main body having a "J" type hook on one end, and a projection on the other end that is disposed at a right angle towards the J-hook. This projection includes a pair of intersecting slots which are oriented essentially perpendicular to the pulling direction of a chain, and which "form a pull-through opening" for the chain. When a chain link is pulled through the intersecting slots, it may be moved along an extension of one of the slots in the projection. A separate securing element is provided to prevent the link in the slot extension from sliding back into the pull-through opening.

U.S. Pat. No. 6,474,676 describes a universal tow bar that is adapted to be attached to a vehicle. One component of one embodiment of this universal tow bar has adjacent J- and T-hooks and a slot that is adapted to receive a link that is attached to a towing strap.

U.S. Pat. No. 3,729,926 describes a claw hook component including a generally flat body having a pair of spaced claws extending from one end. Between the claws is a slot, which is sized to receive a chain link while blocking the movement of adjacent links. In the central part of the flat body is a hole through which a chain may be freely passed. Extending from the side of the hole opposite the claw end of the component is a slot, which has beveled edges. The slot with beveled edges extends in the same direction as the slot between the claws, and is also sized to receive a chain link while blocking the movement of adjacent links.

It would be desirable if a towing accessory could be provided that would offer advantages over these previously known devices.

SUMMARY OF THE INVENTION

The invention comprises a towing accessory for use in connection with a chain having a plurality of links. This towing accessory comprises an elongate body having a first end and a second end, a first long side and a second long side. The elongate body includes a central hole that is configured and sized so that adjacent links of the chain may pass therethrough. The elongate body also includes a first slot that extends from the central hole towards the first end, and a second slot that extends from the central hole towards the second end. Both the first slot and the second slot are configured and sized so that a chain may be locked therein. The towing accessory also includes a J-hook at the first end of the elongate body and a T-hook at the second end of the elongate body. The J-hook has a hook portion that extends away from one side of the elongate body, and the T-hook has a T-cross that extends away from the opposite side of the elongate body.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 3:
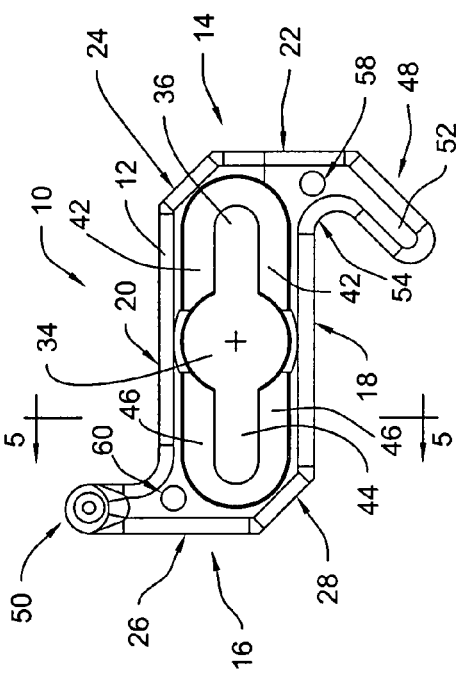
FIG. 3 is a side view of the embodiment of the invention illustrated in FIGS. 1-2.

The drawings illustrate a preferred embodiment of the invention comprising towing accessory 10 which is intended for use in connection with a chain having a plurality of links. Towing accessory 10 comprises elongate body 12 having first end 14, second end 16, first long side 18 and second long side 20. Preferably, elongate body 12 includes first edge 22 that is located at first end 14, which first edge is generally perpendicular to first long side 18. It is also preferred that first angled edge 24 joins first edge 22 of elongate body 12 with second long side 20, as best shown in FIG. 3. Preferably, the angle between first angled edge 24 and first edge 22 of the elongate body is about 135°. It is also preferred that the angle between first angled edge 24 and second long side 20 of the elongate body is about 135°.

It is also preferred, as best shown in FIG. 3, that elongate body 12 include second edge 26 that is located at second end 16, which second edge is generally perpendicular to second long side 20. It is also preferred that second angled edge 28 joins second edge 26 of elongate body 12 with first long side 18. Preferably, the angle between second angled edge 28 and second edge 26 of the elongate body is about 135°. It is also preferred that the angle between second angled edge 28 and first long side 18 of the elongate body is about 135°.

Figure 1:
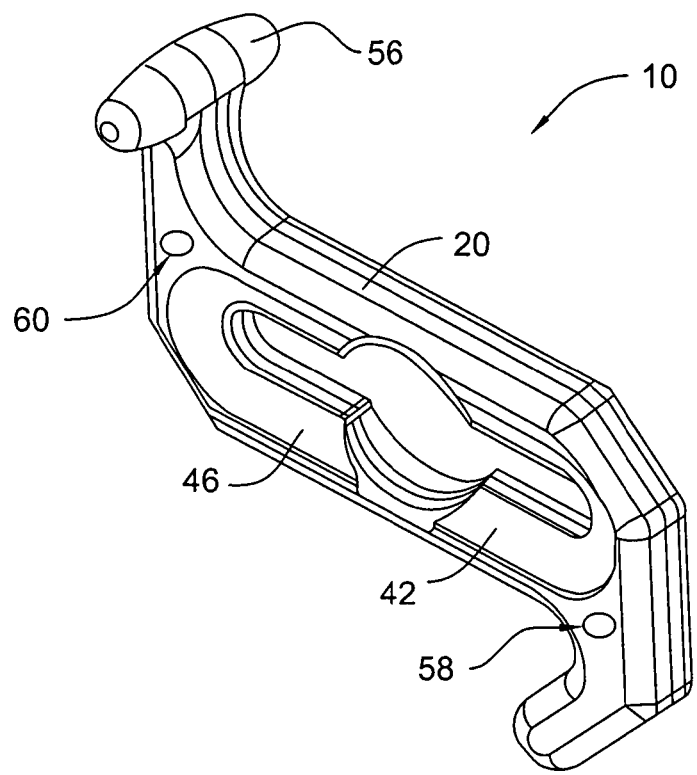
FIG. 1 is a perspective view of a preferred embodiment of the invention.
Figure 6:
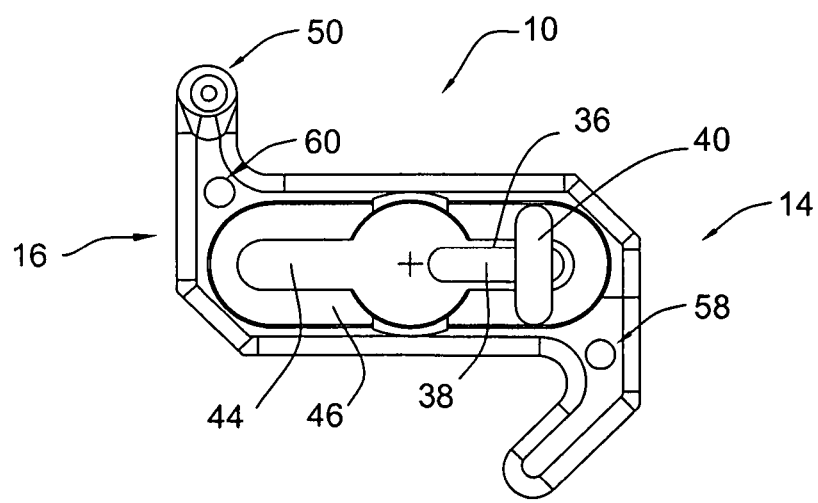
FIG. 6 is a side view of the embodiment on the invention shown in FIGS. 1-5, also showing two links of a chain that may be employed in connection with the invention.
Figure 5:
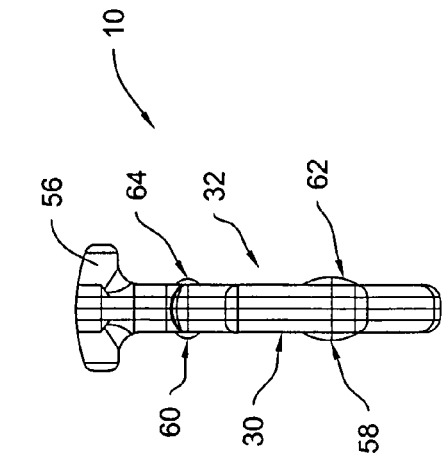
FIG. 5 is a sectional view of the embodiment of the invention illustrated in FIGS. 1-4, taken along the line 5-5 of FIG. 3.
Figure 2:
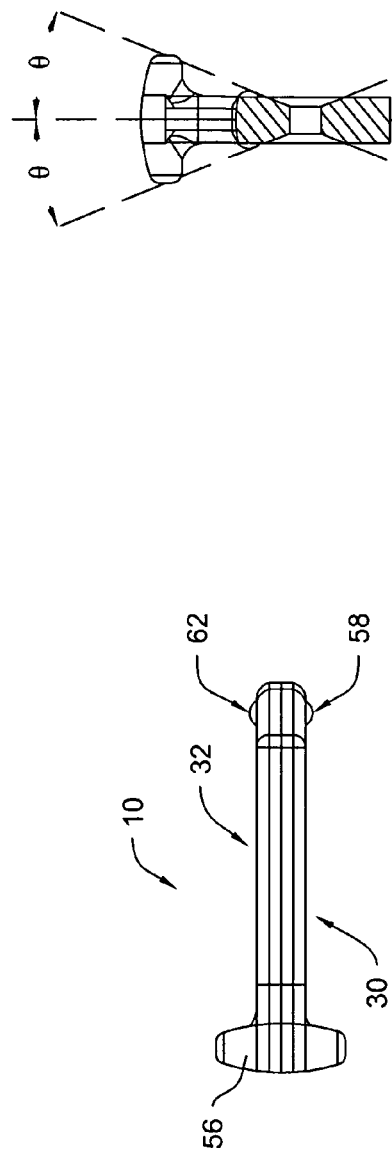
FIG. 2 is a top view of the embodiment of the invention illustrated in FIG. 1.

Elongate body also has front face 30 and rear face 32 (best shown in FIGS. 2 and 4), and includes central hole 34 that is configured and sized so that adjacent links of the chain (not shown in FIGS. 1-5) may pass therethrough. First slot 36, which extends from central hole 34 towards first end 14, is configured and sized so that a chain may be locked therein. Preferably, as shown in FIG. 6, first slot 36 is configured and sized so that the individual links of a chain, such as link 38, will fit within the first slot, and so that when a link of a chain, such as link 38, is in the first slot, an adjacent link, such as link 40, will not pass through the first slot. It is also preferred that first slot 36 is recessed in front face 30 of elongate body 12 by front first beveled surface 42, and that this front first beveled surface has a bevel angle θ within the range of about 10° to about 40°, preferably about 25°, as best shown in FIG. 5. It is also preferred that first slot 36 is recessed in rear face 32 of the elongate body by a rear first beveled surface (not shown, but substantially similar to front first beveled surface 42) having a bevel angle θ within the range of about 10° to about 40°, preferably about 25°.

Second slot 44 extends from the central hole towards second end 16 of elongate body 12. Second slot 44 is also configured and sized so that a chain may be locked therein in the same manner as first slot 36. Thus, it is preferred that second slot 44 be configured and sized so that the individual links of a chain will fit within the second slot, and so that when a link of a chain is in the second slot, an adjacent link will not pass through the second slot. It is also preferred that second slot 44 is recessed in front face 30 of elongate body 12 by front second beveled surface 46, and that this front second beveled surface has a bevel angle θ within the range of about 10° to about 40°, preferably about 25°, as best shown in FIG. 5. Furthermore, it is also preferred that second slot 44 is recessed in rear face 32 of the elongate body by a rear second beveled surface (not shown, but substantially similar to front second beveled surface 46) having a bevel angle θ within the range of about 10° to about 40°, preferably about 25°.

Towing accessory 10 includes J-hook 48 at first end 14 of the body, and T-hook 50 at the second end. Preferably, J-hook 48 has a hook portion 52 that extends away from first long side 18 of elongate body 12. Preferably, as best shown in FIG. 3, J-hook 48 extends away from attachment point 54 that is located adjacent to the elongate body. It is also preferred that T-hook 50 extends away from second long side 20 of elongate body 12 and that the T-hook terminates in T-cross 56. Furthermore, it is also preferred that J-hook 48 and T-hook 50 are located and arranged so that a line between attachment point 54 of the J-hook and the T-cross 56 of the T-hook will pass through central hole 34.

Figure 4:
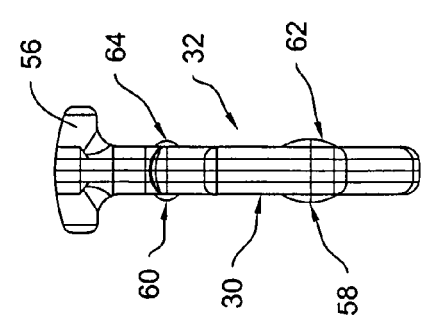
FIG. 4 is an end view of the embodiment of the invention illustrated in FIGS. 1-3.

The elongate body preferably includes a plurality of strengthening bumps comprising additional thickness or mass at stress points adjacent to the J-hook and the T-hook. Thus, as best shown in FIG. 4, elongate body 12 preferably includes first strengthening bump 58 that is located on front face 30 adjacent to J-hook 48, and more particularly, adjacent to attachment point 54. In this preferred embodiment of the invention, elongate body 12 also includes second strengthening bump 60 adjacent to the T-hook on the front face, third strengthening bump 62 adjacent to the J-hook (and more particularly, adjacent to the attachment point) on rear face 32 and fourth strengthening bump adjacent to the T-hook on the rear face. It is also preferred that the first strengthening bump and the second strengthening bump on each face are located and arranged so that a line between the first strengthening bump and the second strengthening bump will pass through the central hole. More particularly, it is preferred that the first strengthening bump and the second strengthening bump on each face are located and arranged so that a line between the first strengthening bump and the second strengthening bump will pass through the center of the central hole.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations, and the same are intended to be comprehended within the meaning and range of equivalents of the appended claims.

What is claimed is:

1. A towing accessory for use in connection with a chain having a plurality of links, said towing accessory comprising an elongate body having a first end and a second end, said elongate body further comprising:
   (a) a central hole that is configured and sized so that adjacent links of the chain may pass therethrough;
   (b) a first slot that extends from the central hole towards the first end, said first slot being configured and sized so that a chain may be locked therein;
   (c) a second slot that extends from the central hole towards the second end, said second slot being configured and sized so that a chain may be locked therein;
   (d) a J-hook at the first end of the body, said J-hook having a hook portion that extends away from the elongate body from an attachment point that is located adjacent to said elongate body;
   (e) a T-hook at the second end of the elongate body, said T-hook extending away from the elongate body and terminating in a T-cross;
   wherein the J-hook and the T-hook are located and arranged so that a line between the attachment point of the J-hook and the T-cross of the T-hook will pass through the central hole.

2. The towing accessory of claim 1 wherein:
   (a) the first slot is configured and sized so that:
      (i) the links of the chain will fit within the first slot; and
      (ii) when a link of the chain is in the first slot, an adjacent link will not pass through the first slot;
   (b) the second slot is configured and sized so that:
      (i) the links of the chain will fit within the second slot; and
      (ii) when a link of the chain is in the second slot, an adjacent link will not pass through the second slot.

3. The towing accessory of claim 1 wherein the first slot and the second slot are recessed within the elongate body.

4. The towing accessory of claim 1 wherein the elongate body includes a first strengthening bump adjacent to the attachment point and a second strengthening bump adjacent to the T-hook.

5. The towing accessory of claim 4 wherein the first strengthening bump and the second strengthening bump are located and arranged so that a line between the first strengthening bump and the second strengthening bump will pass through the central hole.

6. The towing accessory of claim 4 wherein the first strengthening bump and the second strengthening bump are located and arranged so that a line between the first strengthening bump and the second strengthening bump will pass through the center of the central hole.

7. A towing accessory for use in connection with a chain having a plurality of links, said towing accessory comprising an elongate body having a first end and a second end, a first long side and a second long side, said elongate body further comprising:
   (a) a central hole that is configured and sized so that adjacent links of the chain may pass therethrough;
   (b) a first slot that extends from the central hole towards the first end, said first slot being configured and sized so that a chain may be locked therein;
   (c) a second slot that extends from the central hole towards the second end, said second slot being configured and sized so that a chain may be locked therein;
   (d) a J-hook at the first end of the elongate body, said J-hook having a hook portion that extends away from the first long side of the elongate body;
   (e) a T-hook at the second end of the elongate body, said T-hook extending away from the second long side of the elongate body and terminating in a T-cross.

8. The towing accessory of claim 7 wherein:
   (a) the first slot is configured and sized so that:
      (i) the links of the chain will fit within the first slot; and
      (ii) when a link of the chain is in the first slot, an adjacent link will not pass through the first slot;
   (b) the second slot is configured and sized so that:
      (i) the links of the chain will fit within the second slot; and
      (ii) when a link of the chain is in the second slot, an adjacent link will not pass through the second slot.

9. The towing accessory of claim 7 wherein the elongate body includes a first strengthening bump adjacent to the J-hook and a second strengthening bump adjacent to the T-hook.

10. The towing accessory of claim 7 wherein the elongate body includes:
    (a) a front face;
    (b) a rear face;
    (c) a first strengthening bump adjacent to the J-hook on the front face;
    (d) a second strengthening bump adjacent to the T-hook on the front face;
    (e) a third strengthening bump adjacent to the J-hook on the rear face;
    (f) a fourth strengthening bump adjacent to the T-hook on the rear face.

11. The towing accessory of claim 7 wherein the first slot and the second slot are recessed within the elongate body.

12. The towing accessory of claim 7 wherein the elongate body includes:
    (a) a front face; and
    (b) a rear face;
    and wherein the first slot and the second slot:
    (c) are recessed in the front face of the elongate body;
    (d) are recessed in the rear face of the elongate body.

13. The towing accessory of claim 12 wherein:
    (a) the first slot is recessed in the front face of the elongate body by a front first beveled surface having a bevel angle within the range of about 10° to about 40°;
    (b) the first slot is recessed in the rear face of the elongate body by a rear first beveled surface having a bevel angle within the range of about 10° to about 40°;
    (c) the second slot is recessed in the front face of the elongate body by a front second beveled surface having a bevel angle within the range of about 10° to about 40°;
    (d) the second slot is recessed in the rear face of the elongate body by a rear second beveled surface having a bevel angle within the range of about 10° to about 40°.

14. The towing accessory of claim 12 wherein:
    (a) the first slot is recessed in the front face of the elongate body by a front first beveled surface having a bevel angle of about 25°;
    (b) the first slot is recessed in the rear face of the elongate body by a rear first beveled surface having a bevel angle of about 25°;
    (c) the second slot is recessed in the front face of the elongate body by a front second beveled surface having a bevel angle of about 25°;
    (d) the second slot is recessed in the rear face of the elongate body by a rear second beveled surface having a bevel angle of about 25°.

15. The towing accessory of claim 7 wherein:
    (a) the J-hook is adjacent to a first edge that is located at the first end of the elongate body and is generally perpendicular to the first long side of the elongate body;
    (b) the T-hook extends from a second edge that is located at the second end of the elongate body and is generally perpendicular to the second long side of the elongate body.

16. The towing accessory of claim 15 wherein the elongate body includes:
    (a) a first angled edge joining the first edge of the elongate body with the second long side of said elongate body;
    (b) a second angled edge joining the second edge of the elongate body with the first long side of said elongate body.

17. The towing accessory of claim 16 wherein:
    (a) the angle between the first angled edge and the first edge of the elongate body is about 135°;
    (b) the angle between the first angled edge and the second long side of the elongate body is about 135°;
    (c) the angle between the second angled edge and the second edge of the elongate body is about 135°;
    (d) the angle between the second angled edge and the first long side of the elongate body is about 135°.

* * * * *